United States Patent
Asozu (10) Patent No.: US 10,359,674 B2
(45) Date of Patent: Jul. 23, 2019

(54) LIQUID CRYSTAL DISPLAY DEVICE

(71) Applicant: Japan Display Inc., Tokyo (JP)

(72) Inventor: Genki Asozu, Tokyo (JP)

(73) Assignee: Japan Display Inc., Tokyo (JP)

( * ) Notice: Subject to any disclaimer, the term of this patent is extended or adjusted under 35 U.S.C. 154(b) by 90 days.

(21) Appl. No.: 15/262,059

(22) Filed: Sep. 12, 2016

(65) Prior Publication Data

US 2017/0146871 A1 May 25, 2017

(30) Foreign Application Priority Data

Nov. 25, 2015 (JP) ................................. 2015-229727

(51) Int. Cl.
| | | |
|---|---|---|
| *G02F 1/1333* | (2006.01) | |
| *G02F 1/1343* | (2006.01) | |
| *G02F 1/133* | (2006.01) | |
| *G02F 1/1362* | (2006.01) | |
| *G02F 1/1368* | (2006.01) | |
| *G02F 1/1335* | (2006.01) | |
| *G02F 1/1337* | (2006.01) | |
| *G02F 1/137* | (2006.01) | |

(52) U.S. Cl.
CPC ...... *G02F 1/134363* (2013.01); *G02F 1/1368* (2013.01); *G02F 1/13306* (2013.01); *G02F 1/13439* (2013.01); *G02F 1/133308* (2013.01); *G02F 1/133345* (2013.01); *G02F 1/136286* (2013.01); *G02F 1/137* (2013.01); *G02F 1/1337* (2013.01); *G02F 1/133512* (2013.01); *G02F 1/133514* (2013.01); *G02F 2001/133337* (2013.01); *G02F 2001/133388* (2013.01); *G02F 2201/121* (2013.01); *G02F 2201/123* (2013.01)

(58) Field of Classification Search
CPC .......................................... G02F 2001/133337
See application file for complete search history.

(56) References Cited

U.S. PATENT DOCUMENTS

| | | | | |
|---|---|---|---|---|
| 6,803,976 B1 * | 10/2004 | Fujioka | ............. | G02F 1/134336 349/54 |
| 2005/0128367 A1 * | 6/2005 | Hoke | ................ | G02F 1/133371 349/1 |
| 2009/0268145 A1 | 10/2009 | Anjo et al. | | |

(Continued)

FOREIGN PATENT DOCUMENTS

| | | |
|---|---|---|
| JP | H8-328042 A | 12/1996 |
| JP | 2009-265484 A | 11/2009 |

(Continued)

*Primary Examiner* — Edward J Glick
*Assistant Examiner* — Anthony G Quash
(74) *Attorney, Agent, or Firm* — Michael Best & Friedrich LLP (57) ABSTRACT

A liquid crystal display device is configured to prevent the appearance on its display of a black stain stemming from a drop in volume resistivity of liquid crystal caused by ions therein. The device includes a thin-film transistor (TFT) substrate and a counter substrate bonded together along the periphery thereof by a seal material. The TFT substrate and the counter substrate have liquid crystal sandwiched therebetween and include a display region. A third electrode is formed outside the display region of the TFT substrate. A concave portion is formed in an organic insulation film on the liquid crystal side of the third electrode.

12 Claims, 11 Drawing Sheets

(56) References Cited

U.S. PATENT DOCUMENTS

| | | | |
|---|---|---|---|
| 2013/0229401 A1* | 9/2013 | Kim | G09G 3/3648 345/212 |
| 2014/0118667 A1* | 5/2014 | Cho | G02F 1/134309 349/106 |
| 2014/0203260 A1 | 7/2014 | Ookawara et al. | |
| 2014/0307190 A1* | 10/2014 | Tomikawa | G02F 1/13306 349/33 |
| 2015/0029432 A1* | 1/2015 | Ishikawa | G02F 1/13394 349/43 |
| 2016/0091764 A1 | 3/2016 | Asozu et al. | |
| 2016/0131929 A1* | 5/2016 | Lee | H01L 51/5253 257/72 |
| 2017/0025082 A1* | 1/2017 | Kobayashi | G09G 3/3677 |
| 2017/0108750 A1* | 4/2017 | Igeta | G02F 1/133345 |

FOREIGN PATENT DOCUMENTS

| | | |
|---|---|---|
| JP | 2014-142456 A | 8/2014 |
| JP | 2014-206622 A | 10/2014 |
| JP | 2016-071228 A | 5/2016 |

\* cited by examiner

LIQUID CRYSTAL DISPLAY DEVICE

CLAIM OF PRIORITY

The present application claims priority from Japanese Patent Application JP 2015-229727 filed on Nov. 25, 2015, the content of which is hereby incorporated by reference into this application.

BACKGROUND OF THE INVENTION

1. Field of the Invention

The present disclosure relates to a display device. More particularly, the disclosure relates to a liquid crystal display device that provides against display unevenness attributable to ion aggregates.

2. Description of the Related Art

Liquid crystal display devices are generally configured to have a thio-film transistor (TFT) substrate disposed opposite to a counter substrate with liquid crystal sandwiched therebetween, the TFT substrate typically having pixel electrodes and TFTs formed thereon in a matrix pattern. The display device forms an image suitably controlling the light transmittance of liquid crystal molecules per pixel.

Liquid crystal includes impurities that tend to be ionized. Ions move in a particular direction inside a display area of the device and are liable to be localized near the display area periphery. The localized ions reduce the resistance of the liquid crystal. An image displayed on the liquid crystal display area will have a black stain appearing at a location where the liquid crystal resistance is low.

JP-A-2014-142456 describes an organic electroluminescent (EL) display device in which upper transparent electrodes outside the display area are supplied with a cathode voltage via through-holes constituted by a two-layer structure made of a metal film and a transparent conductive film. JP-A-2014-206622 describes a configuration in which dummy electrodes formed outside the display area are impressed with a predetermined voltage to move ions out of the display area. JP-A-2009-265484 describes a configuration in which shielding electrodes are formed outside the display area on the side of the TFT substrate to protect the display area from being affected by a scanning voltage from scanning line leader lines formed in the periphery of the display area. JP-A-1996-328042 describes a configuration in which, with a scanning line driver circuit incorporated in a liquid crystal display panel, shielding electrodes are formed in a manner covering the scanning line driver circuit so as to shield the liquid crystal against a direct-current voltage from the scanning line driver circuit.

SUMMARY OF THE INVENTION

There is a growing need to maximize the display area of the liquid crystal display panel while minimizing the external form of the panel. To do so involves minimizing the width between the edge of the display area and that of the liquid crystal display panel, i.e., the width of the frame. Meanwhile, particular pixel electrode patterns are characterized by their tendency to let ions aggregate in the frame area. In such cases, the ions collected outside the display area tend to move back to the periphery of the display area and are likely to trigger a black stain there.

The present disclosure has been made in view of the above circumstances and provides arrangements for preventing the ions aggregated in the frame area from moving back to the display area, thereby preventing the appearance of a black stain in the screen periphery.

The present disclosure proposes overcoming the above circumstances using the typical embodiments outlined below.

(1) According to one embodiment of the present disclosure, there is provided a liquid crystal display device including a thin-film transistor (TFT) substrate and a counter substrate bonded together along the periphery thereof by a seal material. The TFT substrate and the counter substrate have liquid crystal sandwiched therebetween and include a display area. A third electrode is formed outside the display area of the TFT substrate. A concave portion is formed in an organic insulation film on the liquid crystal side of the third electrode.

(2) Preferably in the liquid crystal display device described in paragraph (1) above, the organic insulation film may be layered over lines other than the third electrode.

(3) Preferably in the liquid crystal display device described in paragraph (1) above, the third electrode may be impressed with the same voltage as that of scanning lines.

BRIEF DESCRIPTION OF THE DRAWINGS

Further objects and advantages of the present disclosure will become apparent upon a reading of the following description and appended drawings in which.

DESCRIPTION OF THE PREFERRED EMBODIMENTS

The behavior of ions dissolved in liquid crystal is described first, prior to the description that follows of specific embodiments of the present disclosure. The ions in liquid crystal tend to be charged positively. The liquid crystal is driven by a voltage impressed between pixel electrodes and a common electrode. The ions dissolved in the liquid crystal aggregate in a particular direction under the influence of the shape of the pixel electrodes, for example.

Figure 10:
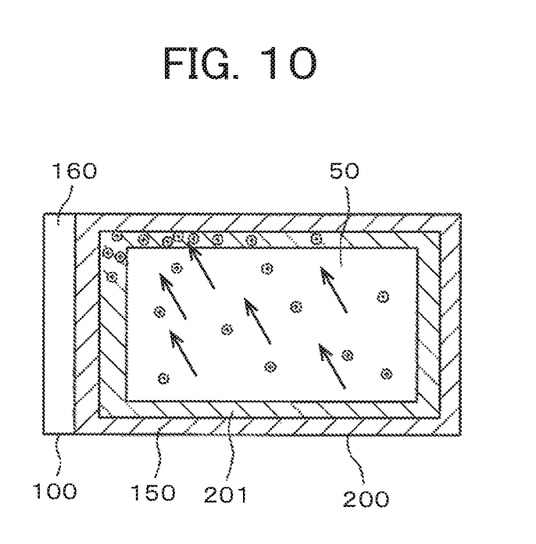
FIG. 10 is a plan view showing how ions move in a liquid crystal display device.
Figure 11:
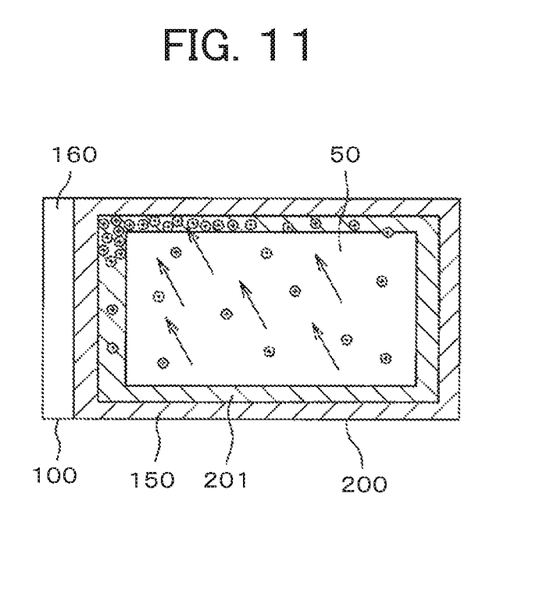
FIG. 11 is another plan view showing how ion move in the liquid crystal display device.

FIG. 10 is a schematic plan view showing how ions behave in liquid crystal. In. FIG. 10, the liquid crystal is sandwiched between a TFT substrate 100 and a counter substrate 200. FIG. 10 shows the ions to be attracted toward the top left corner of the screen. Under the influence of the pixel electrode shape in particular, the ions tend to aggregate in a specific direction of the screen. In FIG. 10, a light shielding film 201 is formed inside a seal material 150, with ions aggregating under the light shielding film 201. Plus marks in FIG. 10 indicate positive ions. FIG. 11 shows a state in which the ions further aggregate over operation time in the periphery of the screen. In FIG. 11, the ions are still outside a display area 50, i.e., under the light shielding film 201, so that images on the screen are left unaffected.

Figure 12:
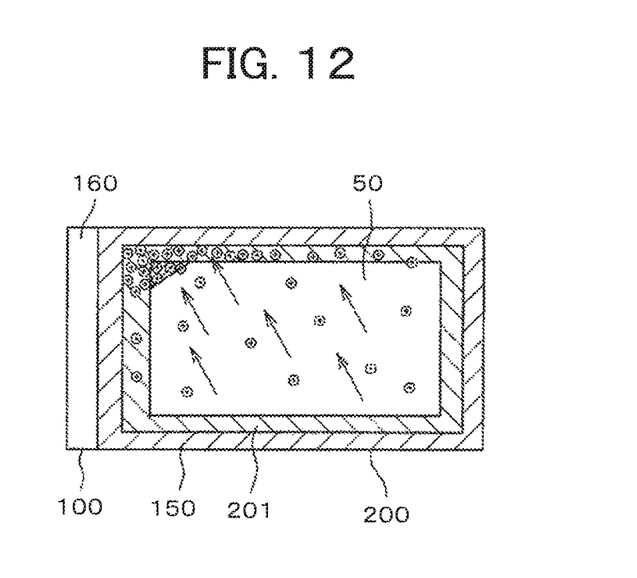
FIG. 12 is a plan view showing how aggregated ions move back to the display area of the liquid crystal display device.

FIG. 12 shows a state in which upon elapse of a further operation time period, the ions aggregating in the top left corner of the display area 50 move from under the light shielding film 201 and into the display area 50. FIG. 12 depicts a black stain being formed in the top left corner of the display area 50 to which the ions have moved.

The phenomenon of ions moving to the display area periphery is more likely to occur the narrower the width of the frame. An object of the present disclosure is to prevent the black stain from appearing in the display area periphery in that manner. The present disclosure will now be described below in detail using embodiments.

First Embodiment

Figure 1:
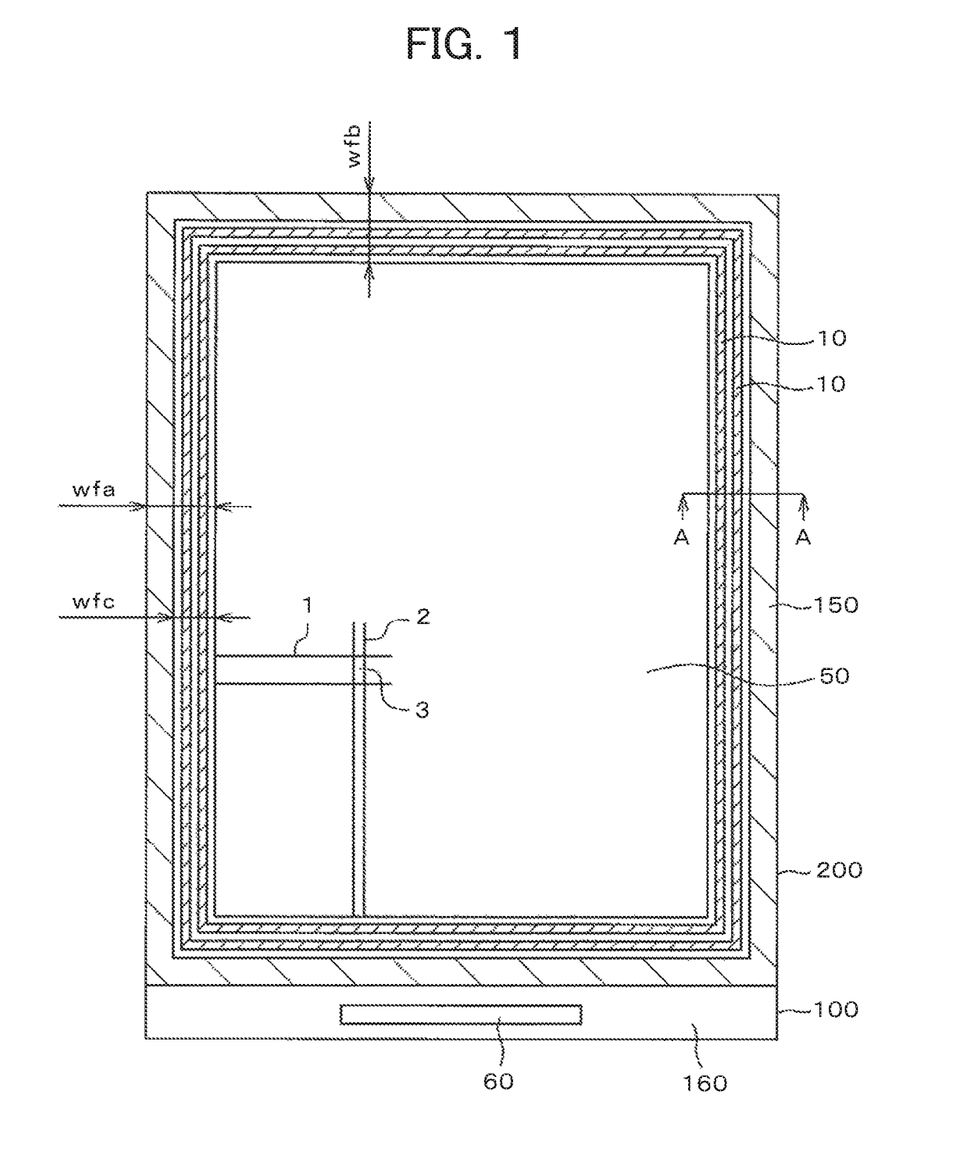
FIG. 1 is a plan view showing a typical crystal display device to which the present disclosure is applied.

FIG. 1 is a plan view showing a liquid crystal display panel to which the present disclosure is applied and which is used on a mobile phone for example. In. FIG. 1, the TFT substrate 100 and the counter substrate 200 are bonded together in the periphery thereof by the seal material 150, the two substrates having liquid crystal sandwiched therebetween. The TFT substrate 100 is formed to be larger than the counter substrate 200. That portion of the TFT substrate 100 which is not covered by the counter substrate 200 constitutes a terminal area 160. A driver integrated circuit (IC) 60 is disposed in the terminal area 160. A flexible wiring substrate for externally feeding power and signals to the liquid crystal display panel is connected to the terminal area 160.

In the display area 50 of FIG. 1, scanning lines 1 extend in a crosswise direction and are arrayed in a longitudinal direction. Video signal lines 2 extend in the longitudinal direction and are arrayed in the crosswise direction. A region enclosed by two scanning lines 1 and two video signal lines 2 constitutes a pixel 3. The pixels 3 are formed in a matrix pattern in the display area 50. A scanning line driver circuit is formed outside the long side of the display area 50.

In recent years, the distance between the edge of the display area and that of the liquid crystal display panel, i.e., the so-called frame width, has been narrowing. For example, the frame width wfa on the long side in FIG. 1 is about 0.5 mm or less. The distance wfc between the edge of the seal material 150 and that of the display area 50 can be about 0.1 mm. Sometimes, the frame width on the long side of the liquid crystal display panel may be different from the frame width on its short side. For example, the short-side frame width wfb in FIG. 1 is about 0.9 mm or less, which may be wider than the long-side frame width. In some cases, the short-side frame width on the terminal area side is different from the short-side frame width on the opposite side.

In FIG. 1, a third electrode 10 for trapping ions is formed inside the seal material 150 and outside the display area 50. A voltage lower than a common voltage is impressed to the third electrode 10. The role of the third electrode 10 impressed with the voltage is to let positive ions aggregate toward the third electrode 10 or to retain the aggregated ions in the periphery of the third electrode 10.

In. FIG. 1, the third electrode 10 is formed in a dual structure, when viewed in a plan view, surrounding the display are 50. The area where the third electrode 10 is not disposed is furnished with lines impressed with a voltage higher than that of the third electrode 10. The positive ions aggregating outside the display area 50 are trapped by the third electrode 10, so that the ions do not move into the display area 50.

The liquid crystal exists inside the seal material 150. In order to let the third electrode 10 affect the liquid crystal more strongly than the other lines, no organic insulation film is disposed over the third electrode 10. On the other hand, an organic insulation film is disposed over the lines other than the third electrode 10. The third electrode 10, thus located closer to the liquid crystal than the other electrodes or lines, influences the liquid crystal more vigorously.

Figure 2:
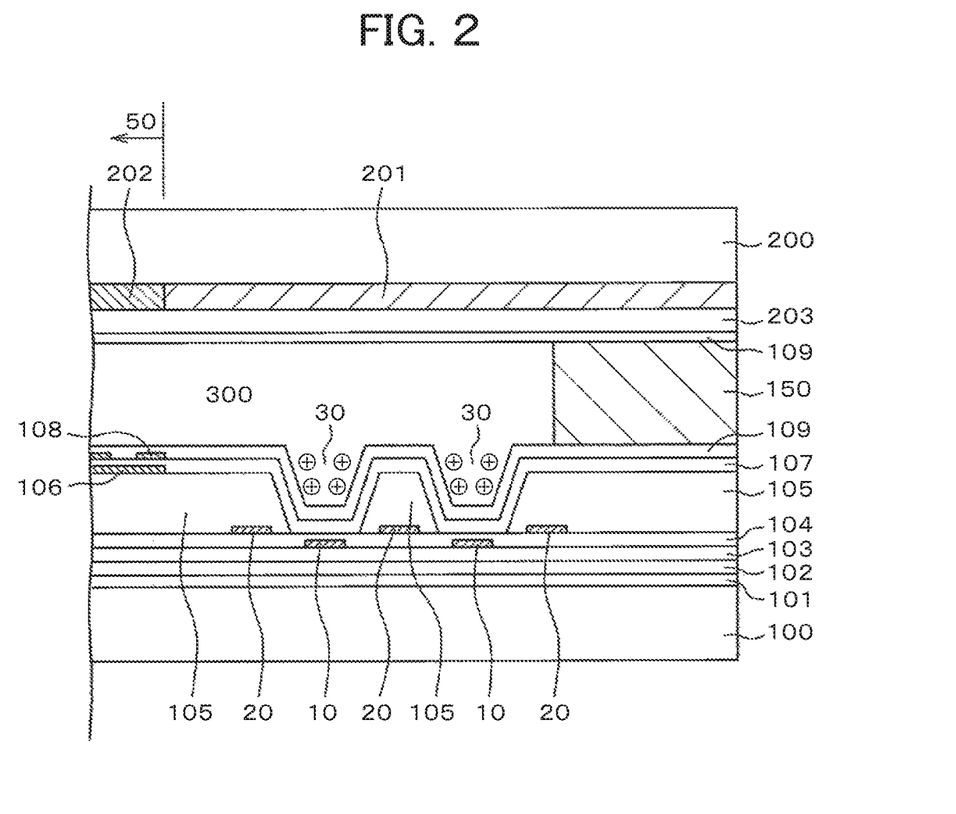
FIG. 2 is a cross-sectional view taken on line A-A in FIG. 1 and showing a first embodiment of the present disclosure.

FIG. 2 is a cross-sectional view taken on line A-A in FIG. 1. A layered structure depicted in FIG. 2 represents a cross-section of a so-called in-plane-switching (IPS) liquid crystal display device. What matters with the liquid crystal display device are its viewing angle characteristics. The IPS method involves driving liquid crystal molecules by electric fields parallel to the substrates, thereby offering good viewing angle characteristics. The IPS method is characterized by the pixel electrodes and the common electrode being formed on the side of the TFT substrate 100. That is, a signal voltage is impressed between a first electrode 106 such as an indium-tin-oxide (ITO) transparent electrode formed flat and a second electrode 108 such as an ITO transparent electrode, with a capacitance insulating film 107 interposed therebetween. The impressed signal voltage rotates liquid crystal molecules to control their transmittance per pixel, thereby forming an image. The first electrode 106 may be constituted by the pixel electrodes or by the common electrode. The second. electrode 108 may also be formed by the pixel electrodes or by the common electrode.

In FIG. 2, a first base film 101 formed by silicon nitride (SiN) is disposed over the TFT substrate 100. A second base film 102 formed by silicon dioxide ($SiO_2$) is disposed over the first base film 101. The first base film 101 and the second base film 102 are intended to protect the semiconductors formed in the display area from being contaminated by impurities from a glass substrate 100.

A gate insulating film 103 is formed over the second base film 102. The third electrode 10 is formed over the gate insulating film 103. The third electrode 10 is formed with the same layer as that of the scanning lines. The third electrode 10 may be supplied with a gate voltage or fed with a low voltage (VL) given to the shift transistors of the scanning line driver circuit formed in the display area periphery. The third electrode 10 may be constituted by scanning line leader lines or by VL lines. That is, the third electrode 10 may or may not be provided solely for its purported purpose.

An interlayer insulating film 104 is formed to cover the third electrode 10. The interlayer insulating film 104 is intended to insulate the scanning lines 1 from the video signal lines 2 in the display area 50. Lines 20 formed with the same layer as that of the video signal lines 2 are disposed over the interlayer insulating film 104. The lines 20 are made up of common electrode lines, common electrode, video signal line leader lines, and lines attached to the scanning line driver circuit, among others. As such, the lines 20 generically represent the electrodes and lines supplied with a voltage equal to or higher than the common voltage. The liquid crystal display device is driven by an alternate current, so that the video signal lines 2 are supplied with positive and negative voltages. In this context, each voltage refers to an average voltage.

An organic passivation film 105 is formed to cover the lines 20. The organic passivation film 105 is formed as thick as about 2 to 3 μm to double as a planarizing film in the display area 50. The organic passivation film 105 is removed where the third electrode 10 is present, so that a concave portion 30 is formed over the third electrode 10. Meanwhile, the electrodes other than the third electrode 10 are covered by the organic passivation film 105. As a result, the third electrode 10 is located closer to the liquid crystal and thus tends to affect the liquid crystal more strongly than the other electrodes. The organic passivation film 105, generally constituted by a photosensitive resin such as acrylic resin or silicone resin, can be patterned without the use of a photoresist. The concave portion 30 may be formed at the same time as the through-holes for feeding the video signal to the pixel electrodes in the display area. That means the formation of the concave portion 30 does not increase process load.

A pixel area is partially shown to the left in FIG. 2. In FIG. 2, the first electrode 106 is formed over the organic passivation film 105. The capacitance insulating film 107 constituted by SiN is formed over the first electrode 106. The second electrode 108 is formed over the capacitance insulating film 107. The video signal impressed between the first and the second electrodes causes electric lines of force to extend in liquid crystal 300, rotating liquid crystal molecules to control the transmittance of the liquid crystal. The second electrode 108 is covered by an alignment film. The insulating film 107 insulating the first electrode 106 from the second electrode 108 is called the capacitance insulating film because the insulating film 107 constitutes a medium that forms a holding capacity between the first electrode 106 and the second electrode 108. In the display area 50, the scanning lines are formed over the gate insulating film 103, and the video signal lines are formed over the interlayer insulating film 104.

Returning to the outside of the display area in FIG. 2, the capacitance insulating film 107 is formed to cover the organic passivation film 105. An alignment film 109 is formed over the capacitance insulating film 107. Because the third electrode 10 strongly affects the inside of the concave portion 30 formed in the organic passivation film 105, the ions aggregating outside the display area are attracted into the concave portion 30. Also, the concave portion 30 serves as a container to accommodate positive ions. The concave portion 30 thus prevents the ions aggregating outside the display area from moving back into the display area. Outside the display area, the alignment film 109 is disposed over the capacitance insulating film 107. The alignment film 109 is intended to define the direction of the initial alignment of liquid crystal molecules in the display area 50.

In FIG. 2, the TFT substrate 100 and the counter substrate 200 are bonded opposite to each other with the seal material 150 interposed therebetween. A black matrix 201 is formed over the counter substrate 200. Color filters 202 are formed on the side of the display area 50. The black matrix 201 in the da splay area 50 is interposed between the color filters 202 to enhance the contrast of the screen. In the seal portion of FIG. 2, the black matrix 201 serves as a light shielding film. An overcoat film 203 is formed to cover the black matrix 201 and the color filters 202. The alignment film 109 is formed over the overcoat film 203.

In FIG. 2, the third electrode 10 may be formed at the same time as, and with the same layer of, the scanning lines in the display area 50. A negative voltage impressed to the third electrode 10 traps positive ions outside the display area and keeps the trapped positive ions where they are. The negative voltage to be impressed here may be the same as the potential impressed to the scanning lines. That is, the scanning lines are impressed with a large positive potential only when turned on; they are impressed with a voltage (negative) smaller than the common voltage while being turned off. Consequently, when the same potential as that of the scanning lines is in use, the third electrode 10 is impressed with the negative voltage during periods other than when the scanning lines are turned on, i.e., the third electrode 10 is fed with the negative voltage almost all the time. Generally, the negative potential ranges from −5 V to −7 V.

Outside the display area, there is also provided the scanning line driver circuit made of shift registers supplied with a low voltage. The low voltage used for the shift register may be impressed to the third electrode 10. In any case, the third electrode 10 is fed with a voltage lower on average than the common voltage. The structure shown in FIG. 2 traps positive ions near the third electrode 10 and keeps the trapped ions inside the concave portion 30 or in its vicinity in the organic passivation film 105. This forestalls the phenomenon of positive ions moving into the display area.

Figure 3:
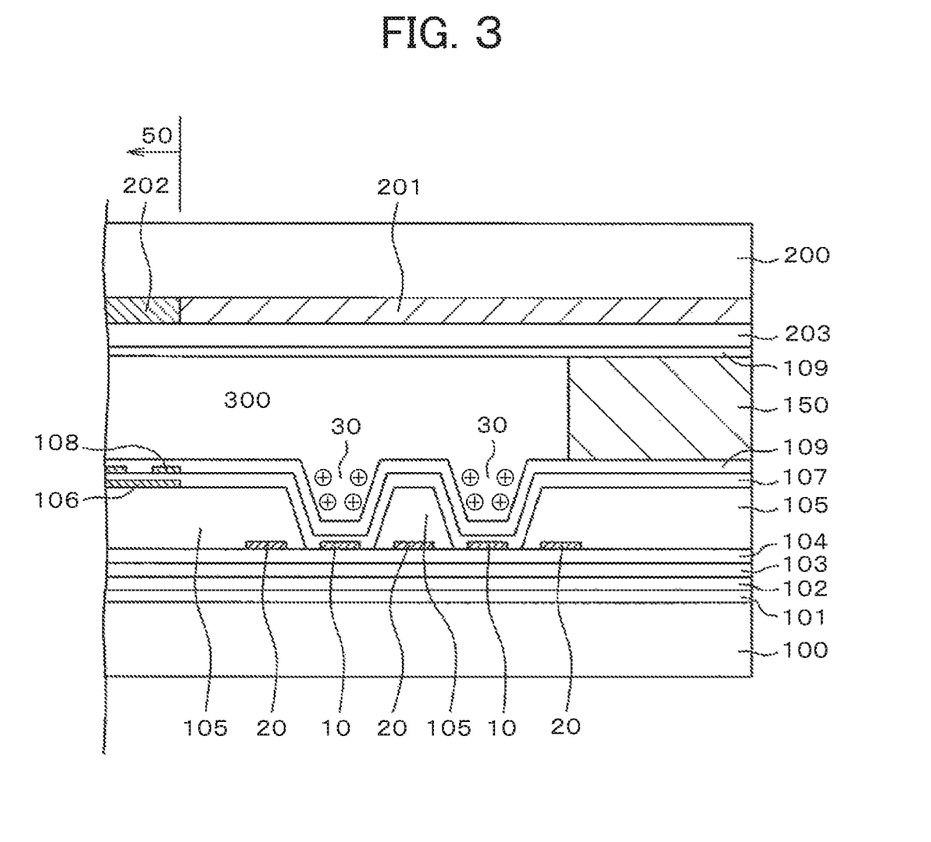
FIG. 3 is a cross-sectional view taken on line A-A in FIG. 1 and showing a variation of the first embodiment.

FIG. 3 is a cross-sectional view showing a variation of the first embodiment. What makes the structure of FIG. 3 different from that of FIG. 2 is that the third electrode 10 is formed with the same layer as that of the video signal lines. The voltage impressed to the third electrode 10 is the gate voltage, or the low voltage fed to the shift registers constituting the scanning line driver circuit, as described above is reference to FIG. 2. In FIG. 3, the third electrode 10 may be impressed with the gate voltage when connected to the scanning line leader lines, for example, via through-holes formed in the interlayer insulating film 104.

In the structure of FIG. 3, the third electrode 10 is topped by only the capacitance insulating film 107 and the alignment film 109. This allows the third electrode 10 to be still closer to the liquid crystal 300 than in the structure of FIG. 2. That means the third electrode 10 affects positive ions still more strongly. Positive ions are trapped and retained in the concave portion 30 in the organic passivation film 105 in the same manner described above in reference to FIG. 2.

Figure 4:
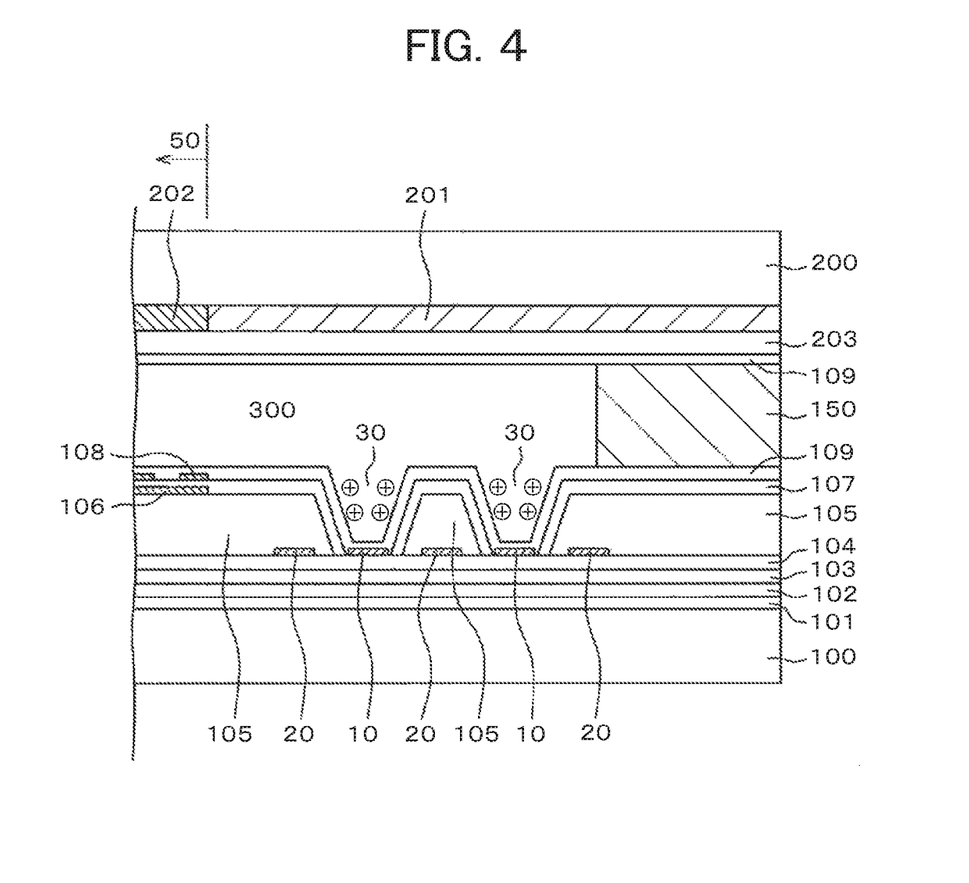
FIG. 4 is a cross-sectional view taken on line A-A in FIG. 1 and showing another variation of the first embodiment.

FIG. 4 is a cross-sectional view showing another variation of the first embodiment. What makes the structure of FIG. 4 different from that of FIG. 2 or 3 is that only the alignment film 109 is interposed between the third electrode 10 and the liquid crystal 300. This structure allows the third electrode 10 to exert its influence still more strongly.

In. FIG. 4, as in FIG. 3, the third electrode 10 is formed with the same layer as that of the video signal lines. However, in FIG. 4, the capacitance insulating film 107 is removed from the concave portion 30 in the organic passivation film 105. This allows the third electrode 10 to be still closer to the liquid crystal 300. It is preferred that the capacitance insulating film 107 cover the side walls of the concave portion 30 in the organic passivation film 105. This structure prevents moisture and other impurities from seeping to the liquid crystal side through the organic passivation film 105.

Figure 5:
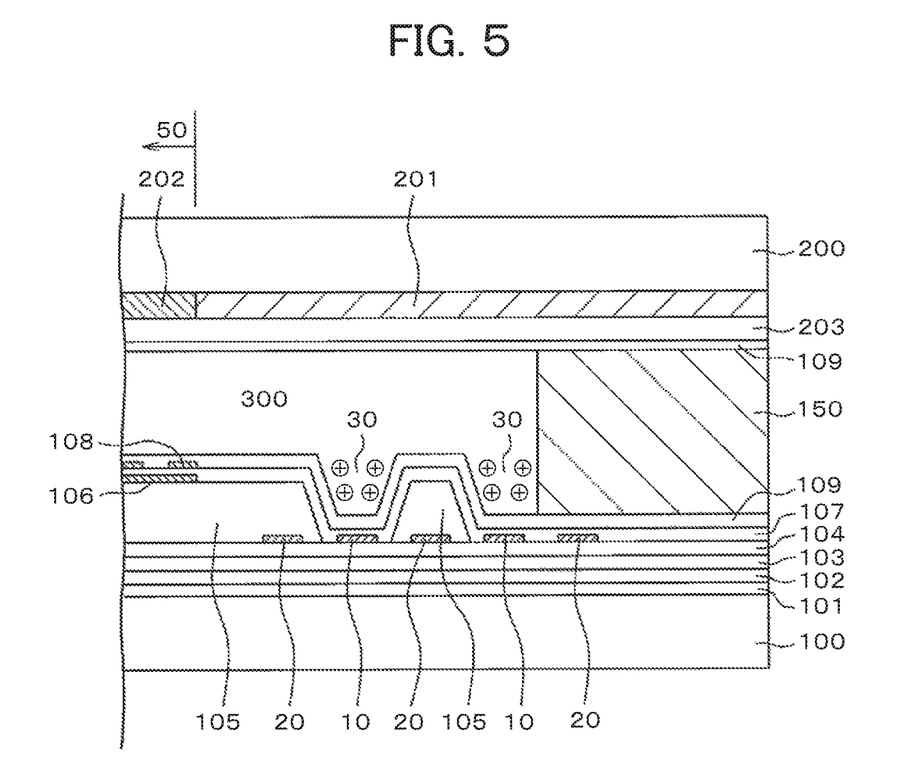
FIG. 5 is a cross-sectional view taken on line A-A in FIG. 1 and showing still another variation of the first embodiment.

FIG. 5 is a cross-sectional view showing still another variation of the first embodiment. What makes the structure of FIG. 5 different from that of FIG. 2, 3 or 4 is that the organic passivation film 105 is removed from where the seal material 150 is formed. The seal material 150 in the seal portion can be made thicker by as much as the mass of the missing organic passivation film 105. This structure contributes in improving the reliability of the seal material being bonded. The structure also prevents moisture and other impurities from seeping in from the outside through the organic passivation film 105.

In FIG. 5, as in FIG. 3, the third electrode 10 is formed with the same layer as that of the video signal lines. Positive ions are trapped in the concave portion 30 of the organic passivation film 105. In the structure of FIG. 5, positive ions are also trapped in the concave portion 30 formed between the organic passivation film 105 and the seal material 150.

In FIG. 5, as in FIG. 2, the third electrode 10 is topped by the capacitance insulating film 107 and the alignment film 109. Alternatively, as in FIG. 2, the third electrode 10 may be topped by the interlayer insulating film 104, capacitance insulating film 107, and alignment film 109. In another alternative, as in FIG. 4, the third electrode 10 may be topped by only the alignment film 109. The effect of trapping ions using the structure in FIG. 5 is the same as described above in reference to the structures in FIGS. 2, 3 and 4.

Second Embodiment

Figure 6:
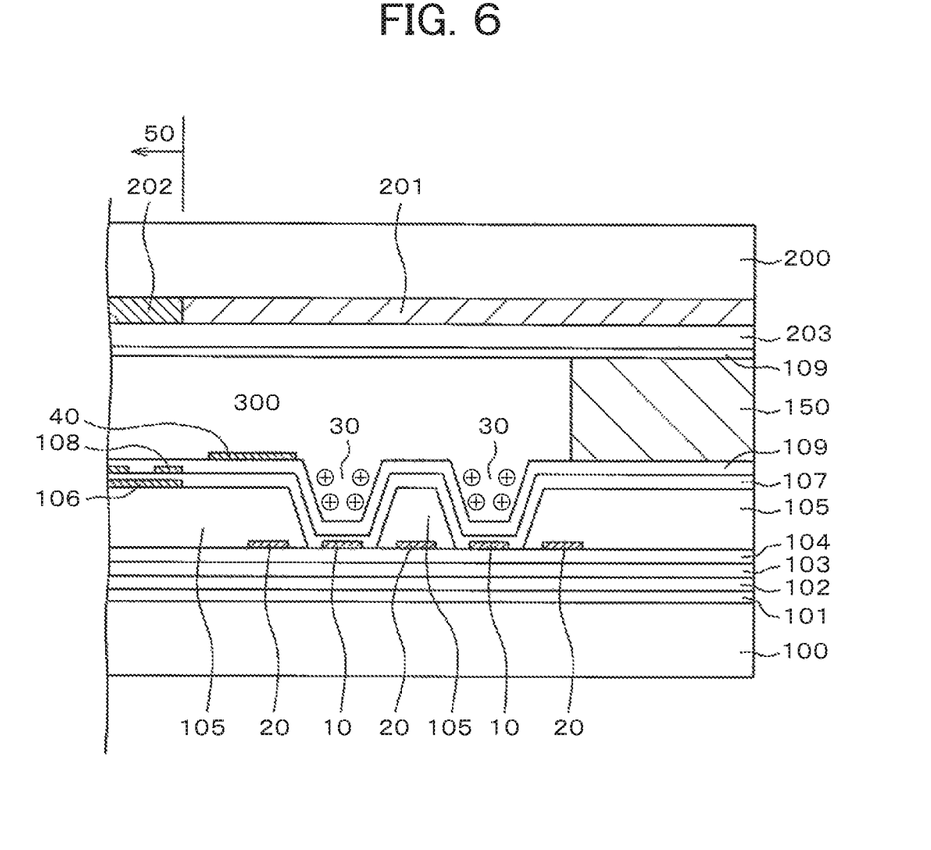
FIG. 6 is a cross-sectional view taken on line A-A in FIG. 1 and showing a second embodiment of the present disclosure.

FIG. 6 is a cross-sectional view showing a second embodiment of the present disclosure. The cross-sectional view in FIG. 6 is also taken on line A-A in FIG. 1. What is shown in FIG. 6 is a cross section structure corresponding to that of the first embodiment in FIG. 3. That is, the third electrode 10 is formed with the same layer as that of the video signal lines. What makes the structure of FIG. 6 different from that of FIG. 3 is that a fourth electrode 40 is formed between the third electrode 10 and the display area 50. The fourth electrode 40 may be formed using the same transparent conductive film as that of the second electrode 108.

A negative voltage impressed to the third electrode 10 causes positive ions in the liquid crystal to be attracted toward the third electrode 10. This protects the display area 50 from being adversely affected by positive ions. However, especially when the frame area is appreciably narrowed, the third electrode 10 located where it is may let its potential affect the display area 50. That in turn may affect the behavior of the liquid crystal, disturbing the formation of an image in the screen periphery.

With the second embodiment, as shown in FIG. 6, the fourth electrode 10 interposed between the third electrode 10 and the display area 50 prevents a trapping voltage impressed to the third electrode 10 from reaching the display area 50. The structure in FIG. 6 is substantially the same as the structure in FIG. 3 except that the fourth electrode 40 is formed between the display area 50 and the third electrode 10. That is, the ions migrating from the display area 50 are captured by the third electrode 10 and stay in the concave portion 30 or in its vicinity in the organic passivation film 105. Meanwhile, the effect of the third electrode 10 on the display area 50 is minimized by the presence of the fourth electrode 40.

The fourth electrode 40 in FIG. 6 is formed with the same transparent conductive film and in the same layer as that of the second electrode 108 in the display area 50. Alternatively, the fourth electrode 40 may be formed with the same transparent conductive film and in the same layer as that of the first electrode 106. Whereas the structure in FIG. 6 corresponds to that in FIG. 3, the fourth electrode 40 may also be formed in the structure of FIG. 2, 4, or 5 in the same manner as in the structure of FIG. 6. The fourth electrode 40 thus disposed minimizes the effect of the third electrode 10 of the display area 50.

Third Embodiment

A third embodiment of the present disclosure features an area that has a trap structure formed including the third electrode 10 as viewed in a plan view of the liquid crystal display panel. The structure in FIG. 1 of the first embodiment has a trap structure formed including the third electrode 10 surrounding the entire display area 50. However, ions aggregate not necessarily along the entire periphery but often in a particular region of the frame area. The third electrode 10 is impressed with the gate voltage or a low voltage for the shift registers constituting the scanning line driver circuit. This electrode arrangement is sometimes difficult to form depending on where it is to be located.

Figure 7:
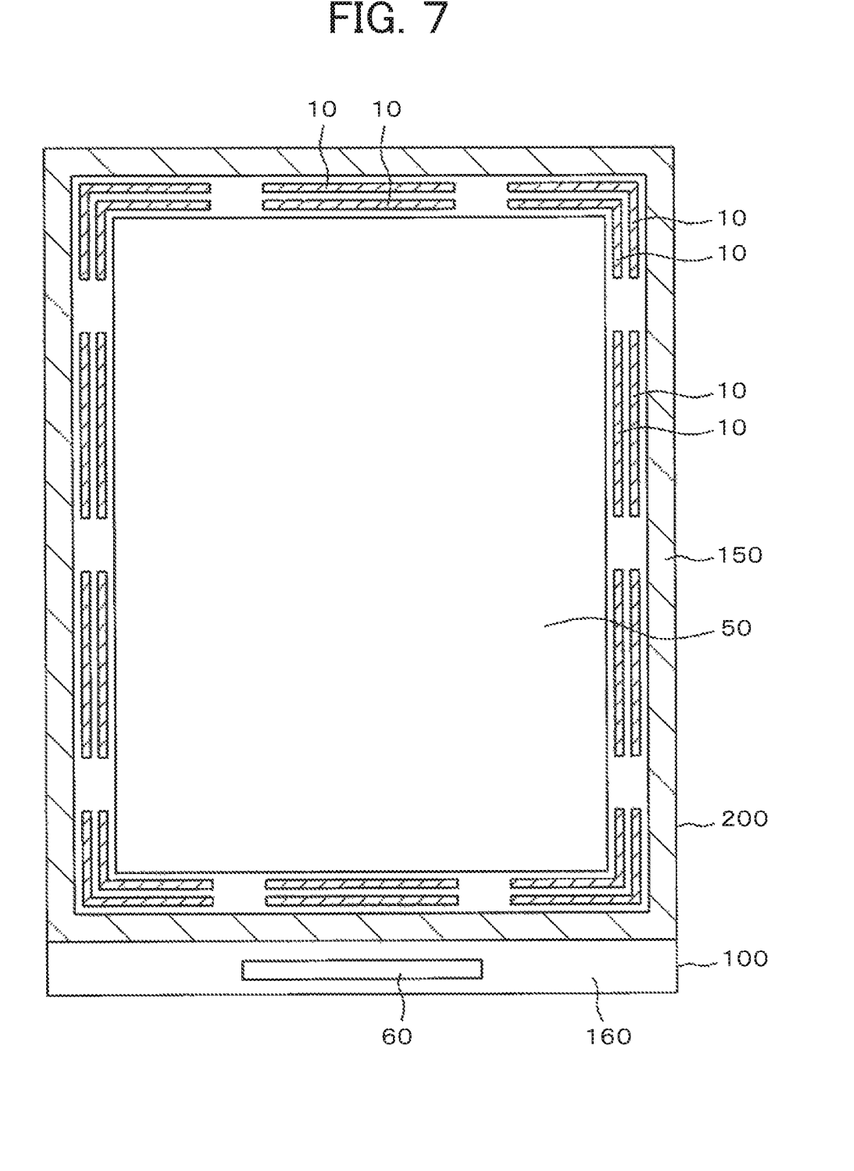
FIG. 7 is a plan view showing a third embodiment of the present disclosure.
Figure 8:
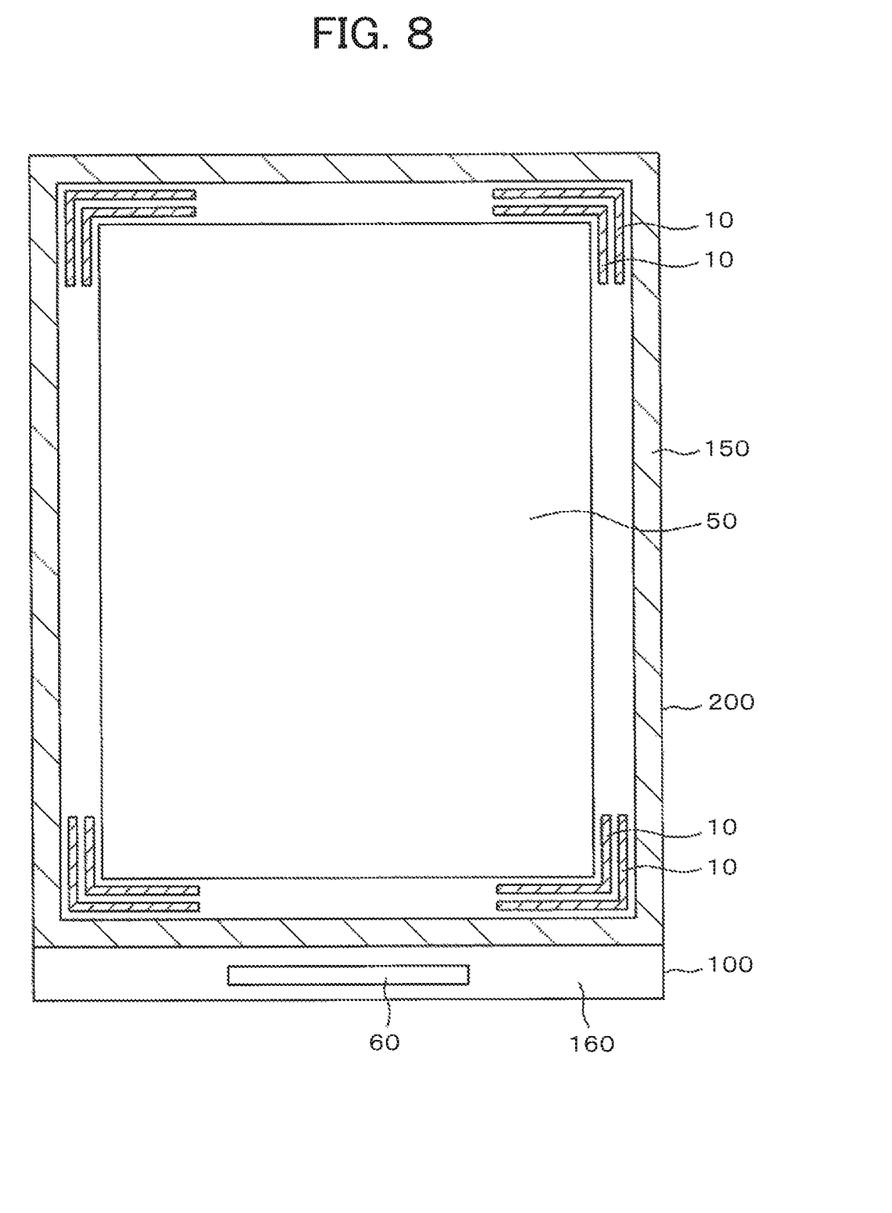
FIG. 8 is a plan view showing one variation of the third embodiment.
Figure 9:
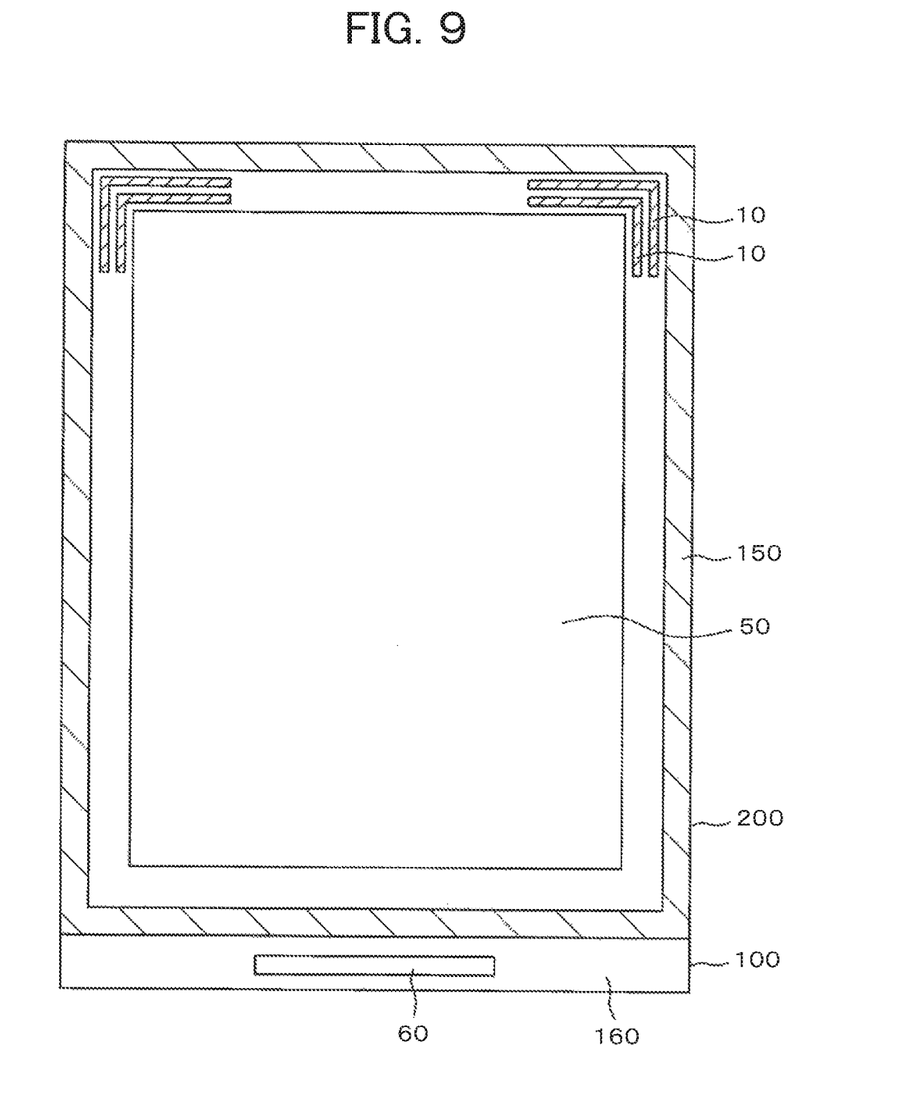
FIG. 9 is a plan view showing another variation of the third embodiment.

FIG. 7 shows an example in which the difficulty above is bypassed by forming at intervals a trap structure that includes the third electrode 10. FIG. 8 shows an example in which, where ions tend to aggregate in the corners of the liquid crystal display panel, the trap structure 10 is formed only in the corners. As shown in FIGS. 10 to 12, ions often aggregate in particular corners. In such a case, as shown in FIG. 9, the trap structure including the third electrode 10 need only be formed in specific corners. FIG. 9 shows an example that has the trap structure formed in two corners opposite to the terminal area 160, the trap structure including the third electrode 10. Although the example of FIG. 9 has the trap structure formed in two corners, only one corner may need to be furnished with the trap structure in some cases.

The foregoing description was based on the assumption that the IPS liquid crystal display device is in use. However, the present disclosure is not limited to IPS devices but is also applicable to liquid crystal display devices operating on the twisted nematic (TN) method or the vertical alignment (VA) method, for example.

What is claimed is:

1. A liquid crystal display device comprising a thin-film transistor (TFT) substrate and a counter substrate bonded together along periphery thereof by a seal material, the TFT substrate and the counter substrate having liquid crystal sandwiched therebetween a display region and a peripheral region in an area surrounded by the seal material, the peripheral region arranged between the seal material and the display region, a plurality of video signal lines and a plurality of scanning lines;

wherein an organic insulating film is formed in the display region and the peripheral region, in the display region, a first electrode is formed on the organic insulating film, a second electrode is formed over the first electrode via an insulating film, the liquid crystal is driven by applying a voltage between the first electrode and the second electrode, wherein a third electrode is formed between the liquid crystal and the TFT substrate in the peripheral region of the TFT substrate; and wherein a concave portion is formed in the organic insulation film on the liquid crystal side of the third electrode, wherein a scanning line driver circuit is formed in the peripheral region, the scanning line driver circuit supplies a scanning voltage to each of the scanning lines in the display region, and the third electrode is impressed with a same voltage as the scanning voltage supplied to each of the scanning lines.

2. The liquid crystal display device according to claim 1, wherein the third electrode is formed with the same layer as that of scanning lines in the display region.

3. The liquid crystal display device according to claim 1, wherein the third electrode is formed with the same layer as that of video signal lines in the display region.

4. The liquid crystal display device according to claim 1, wherein only an alignment film is interposed between the third electrode and the liquid crystal.

5. The liquid crystal display device according to claim 1, wherein the seal material does not overlap with the organic insulation film.

6. The liquid crystal display device according to claim 1, wherein the third electrode and the concave portion of the organic insulation film are formed in a manner surrounding the entire display region.

7. The liquid crystal display device according to claim 1, wherein the third electrode and the concave portion of the organic insulation film are formed in a manner surrounding the display region with space in between.

8. The liquid crystal display device according to claim 1, wherein the third electrode and the concave portion of the organic insulation film are formed only outside the corners of the display region.

9. The liquid crystal display device according to claim 1, wherein the third electrode and the concave portion of the organic insulation film are formed only outside some of multiple corners of the display region.

10. The liquid crystal display device according to claim 1, wherein a fourth electrode is formed between the third electrode and the display region.

11. The liquid crystal display device according to claim 10, wherein the fourth electrode is formed with the same layer as that of the first electrode.

12. The liquid crystal display device according to claim 10, wherein the fourth electrode is formed with the same layer as that of the second electrode.

* * * * *